United States Patent  
Ohishi et al.

(10) Patent No.: US 10,780,503 B2
(45) Date of Patent: Sep. 22, 2020

(54) WEAR-RESISTANT COMPONENT AND METHOD FOR PRODUCING THE SAME

(71) Applicant: KOMATSU LTD., Tokyo (JP)

(72) Inventors: Masayuki Ohishi, Tokyo (JP); Masaharu Amano, Himi (JP); Yoshikiyo Tanaka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 20 days.

(21) Appl. No.: 16/089,332

(22) PCT Filed: May 15, 2017

(86) PCT No.: PCT/JP2017/018244
§ 371 (c)(1),
(2) Date: Sep. 27, 2018

(87) PCT Pub. No.: WO2017/199922
PCT Pub. Date: Nov. 23, 2017

(65) Prior Publication Data
US 2019/0111488 A1    Apr. 18, 2019

(30) Foreign Application Priority Data
May 17, 2016 (JP) ................................ 2016-099091

(51) Int. Cl.
| *B22F 7/08* | (2006.01) |
| *B25D 17/02* | (2006.01) |
| *E02F 9/28* | (2006.01) |
| *B22F 7/00* | (2006.01) |
| *C22C 38/12* | (2006.01) |
| *C22C 38/00* | (2006.01) |

(52) U.S. Cl.
CPC .................. *B22F 7/08* (2013.01); *B22F 7/00* (2013.01); *B25D 17/02* (2013.01); *E02F 9/28* (2013.01); *E02F 9/285* (2013.01); *E02F 9/2883* (2013.01); *C22C 38/00* (2013.01); *C22C 38/12* (2013.01)

(58) Field of Classification Search
CPC ....................................................... E02F 9/285
See application file for complete search history.

(56) References Cited

U.S. PATENT DOCUMENTS

| 5,785,109 A | 7/1998 | Hongawa |
| 2014/0178242 A1 | 6/2014 | Sano et al. |

FOREIGN PATENT DOCUMENTS

| JP | S57-16106 A | 1/1982 |
| JP | H03-23025 A | 1/1991 |
| JP | H04-88137 A | 3/1992 |
| JP | H05-77042 A | 3/1993 |
| JP | H07-303956 A | 11/1995 |
| JP | H09-287038 A | 11/1997 |

(Continued)

OTHER PUBLICATIONS

Aug. 15, 2017 International Search Report issued in International Patent Application No. PCT/JP2017/018244.

*Primary Examiner* — Ian A Rummel
(74) *Attorney, Agent, or Firm* — Oliff PLC

(57) ABSTRACT

A tooth, which is a wear-resistant component, includes a core, and a body made of a first metal and disposed to enclose the core. The core includes a matrix made of a second metal, first hard particles dispersed in the matrix, and a hard structure extending from the corresponding first hard particle in a direction along the grain flow in the body, the hard structure being higher in hardness than the matrix.

12 Claims, 10 Drawing Sheets

(56) References Cited

FOREIGN PATENT DOCUMENTS

| | | |
|---|---|---|
| JP | H11-131534 A | 5/1999 |
| JP | 2002-144254 A | 5/2002 |
| JP | 2013-046928 A | 3/2013 |
| WO | 2012/157455 A1 | 11/2012 |

WEAR-RESISTANT COMPONENT AND METHOD FOR PRODUCING THE SAME

TECHNICAL FIELD

The present invention relates to a wear-resistant component and a method for producing the wear-resistant component.

BACKGROUND ART

For a component requiring wear resistance (or a wear-resistant component), a material having high hardness is generally used from the standpoint of improving the wear resistance. Hydraulic excavators, bulldozers, wheel loaders, and other work machines that operate in an environment where sand and other materials exist include wear-resistant components such as ripping tips or teeth as their constituent components. A hydraulic breaker used for crushing rocks and the like includes a chisel as a wear-resistant component that cuts rocks.

Regarding such a wear-resistant component, it has been proposed to form a core made of a material higher in hardness than the surface layer (the body) to further improve wear resistance of the component (see, for example, Japanese Patent Application Laid-Open No. H11-131534 (Patent Literature 1) and Japanese Patent Application Laid-Open No. 2002-144254 (Patent Literature 2)).

CITATION LIST

Patent Literature

Patent Literature 1: Japanese Patent Application Laid-Open No. H11-131534
Patent Literature 2: Japanese Patent Application Laid-Open No. 2002-144254

SUMMARY OF INVENTION

Technical Problem

In the case of forming the core using a material higher in hardness than the body as in Patent Literatures 1 and 2, if the material (having high wear resistance) having a hardness considerably higher than that of the body is adopted as the material for the core, the difference in material between the core and the body will cause a great difference in linear expansion coefficient between the core and the body, making it difficult to maintain good adhesion therebetween. In order to reduce the difference in linear expansion coefficient between the core and the body, a material having sufficient hardness will not be easily used for the core. It has thus been difficult to significantly improve the wear resistance while ensuring good adhesion between the core and the body.

The present invention has been made to address the above-described problems. An object of the present invention is to provide a wear-resistant component that offers considerably improved wear resistance while ensuring good adhesion between the core and the body.

Solution to Problem

A wear-resistant component according to the present invention includes: a core; and a body disposed to enclose the core, the body being made of a first metal. The core includes a matrix made of a second metal, first hard particles dispersed in the matrix, and a hard structure extending from the corresponding first hard particle in a direction along grain flow in the body, the hard structure being higher in hardness than the matrix.

In the wear-resistant component according to the present invention, high wear resistance is implemented by the presence of the core including the first hard particles. The core is not made of a single material, but includes the matrix and the first hard particles. When the matrix is made of a material that is expected to offer good adhesion with the body, for example a material having a linear expansion coefficient close to that of the material forming the body, then the resultant core can improve adhesion between the core and the body, while ensuring high wear resistance by the first hard particles. The first metal forming the body and the second metal forming the matrix of the core may be a same metal. The presence of the hard structures in the core, extending along the grain flow in the body, further improves the wear resistance of the core, without impairing the adhesion between the core and the body.

As described above, according to the wear-resistant component of the present invention, it is possible to significantly improve the wear resistance while ensuring good adhesion between the core and the body.

In the wear-resistant component described above, the hard structure may include an element constituting the first hard particle. This facilitates formation of the hard structure extending from the first hard particle.

In the wear-resistant component described above, the core may extend along the grain flow in the body. This facilitates acquisition of good adhesion between the body and the core.

In the wear-resistant component described above, the matrix may be made of a sintered body. This facilitates formation of the core.

In the wear-resistant component described above, the first metal may be steel. The steel is suitable as the first metal forming the body.

In the wear-resistant component described above, the second metal may be steel. The steel is suitable as the second metal forming the matrix of the core.

The wear-resistant component described above may further include an overlay disposed in contact with the body to cover a covered region which is a part of a surface of the body. In an overlay edge portion corresponding to a boundary between the covered region and an exposed region other than the covered region on the surface of the body, the exposed region and a surface of the overlay may be flush with each other to form a forged surface.

For improving the wear resistance of a wear-resistant component, an overlay may be formed to cover a part of the surface. The overlay may be formed by overlaying welding, for example. In a wear-resistant component with an overlay formed, in an overlay edge portion corresponding to a boundary between a region (covered region) covered with the overlay and a region (exposed region) other than the covered region on the surface of the body, a step is usually formed between the surface of the overlay and the exposed region of the body. This step may cause a disadvantage attributable to the formation of the overlay. For example, an overlay may be formed on a bucket tooth of a hydraulic excavator. While the overlay formed can improve the wear resistance of the tooth, the tooth may suffer increased penetration resistance in earth and sand due to the step formed.

In the overlay edge portion, making the exposed region of the body and the surface of the overlay flush with each other can prevent the disadvantage due to the formation of the overlay that would otherwise be caused by the step described above. With the overlay edge portion included in the forged surface, the working step such as cutting for making the exposed region of the body and the surface of the overlay flush with each other can be omitted. Consequently, the working on the overlay edge portion where the difference in hardness is great and the working on the overlay which is high in hardness can be avoided.

In the wear-resistant component described above, the overlay may include a base matrix made of a third metal, and second hard particles dispersed in the base matrix. This facilitates formation of the overlay excellent in wear resistance.

In the wear-resistant component described above, the second hard particles located in an overlay surface region may be arranged side by side while being embedded in the overlay, the overlay surface region being a region within an average particle diameter of the second hard particles from the surface of the overlay. This prevents the second hard particles from being arranged protruding noticeably from the surface of the overlay. As a result, the second hard particles are prevented from falling off during the use of the wear-resistant component. It should be noted that the average particle diameter of the second hard particles may be obtained by observing a cross section perpendicular to the surface of the overlay with an optical microscope, and by calculating an average of the diameters of ten second hard particles observed.

In the wear-resistant component described above, the second hard particles located in the overlay surface region may be arranged in contact with the surface of the overlay. With this, the region of a second hard particle exposed from the surface of the overlay becomes small, which prevents the second hard particle from falling off.

In the wear-resistant component described above, among the second hard particles located in the overlay surface region, any second hard particle having a region exposed from the surface of the overlay may have an acute central angle (of less than 90°) corresponding to that exposed region. With this, the region of a second hard particle exposed from the surface of the overlay becomes small, which prevents the second hard particle from falling off.

In the wear-resistant component described above, in a region including an interface between the overlay and the body, the overlay may include a protrusion that protrudes toward the body. This prevents the overlay from coming off the body.

In the wear-resistant component described above, the protrusion may have at least a part of the second hard particle received therein. This more reliably prevents the overlay from coming off the body.

The wear-resistant component described above may have a tip end. The core may extend toward the tip end. Wear-resistant components often wear away from the tip end. The core extending toward the tip end can prevent progress of such wear.

A method for producing a wear-resistant component according to the present invention includes the steps of: preparing a body material made of a first metal and having a recess; filling the recess with raw powders including powder of a second metal and first hard particles; and forming, by hot forging, the body material having the recess filled with the raw powders.

According to the wear-resistant component producing method in the present invention, it is readily possible to produce the above-described wear-resistant component in the present invention.

Effects of Invention

As is clear from the above description, according to the wear-resistant component and its producing method of the present invention, it is possible to provide a wear-resistant component that offers considerably improved wear resistance while ensuring good adhesion between the core and the body.

DESCRIPTION OF EMBODIMENTS

Figure 1:
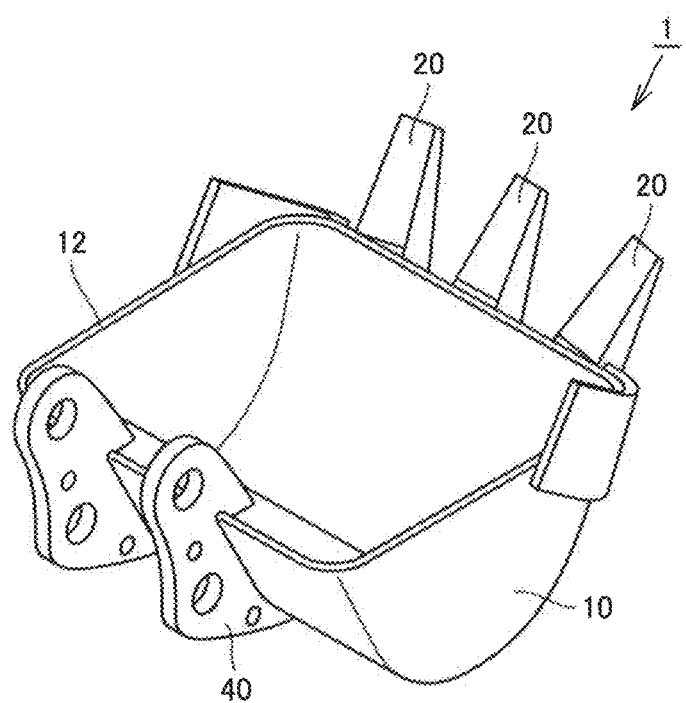
FIG. 1 is a schematic perspective view showing the structure of a bucket of a hydraulic excavator.

Embodiments of the present invention will now be described. In the following drawings, the same or corresponding parts are denoted by the same reference numerals, and the description thereof will not be repeated.

First Embodiment

Figure 2:
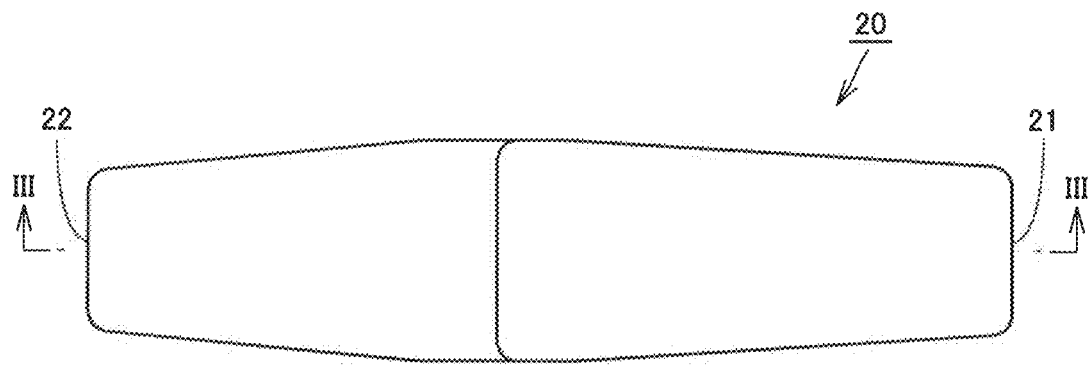
FIG. 2 is a schematic plan view showing the structure of a tooth.
Figure 3:
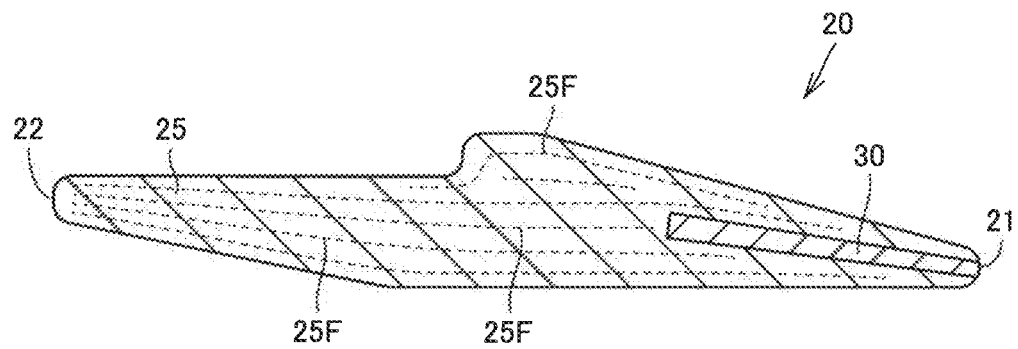
FIG. 3 is a schematic cross-sectional view taken along the line in FIG. 2.

A wear-resistant component according to the present embodiment will be described by giving as an example a bucket tooth of a hydraulic excavator. FIG. 1 is a schematic perspective view showing the structure of a bucket of a hydraulic excavator. FIG. 2 is a schematic plan view showing the structure of a tooth. FIG. 3 is a schematic cross-sectional view taken along the line in FIG. 2.

Referring to FIG. 1, a bucket 1, which is attached to a tip end of an arm (not shown) of a hydraulic excavator, is for excavating earth and sand. The bucket 1 includes: a main body 10, made up of a plate-like member and having an opening; a plurality of (in the bucket 1 shown in FIG. 1, three) teeth 20 attached to the main body 10 to partially protrude from a periphery 12 of the opening of the main body 10 on its excavating side; and a mounting portion 40 disposed on a side of the main body 10 opposite to the side where the teeth 20 are attached. The bucket 1 is supported by the arm of the hydraulic excavator via the mounting portion 40. When the bucket 1 is used for excavation, the teeth 20 penetrate into earth and sand first. The teeth 20 are thus required to have high wear resistance (earth and sand abrasion resistance). The teeth 20 are earth and sand abrasion resistant components that are machine components used for applications where they come into contact with earth and sand.

A tooth 20 includes a tip end 21 and a proximal end 22, as shown in FIG. 2. The tooth 20 is attached to the main body 10 at its proximal end 22 side, with its tip end 21 side protruding from the periphery 12 of the opening of the bucket 1. The bucket 1 penetrates into earth and sand from the tip end 21 side of the tooth 20. The tip end 21 side of the tooth 20 thus requires particularly high wear resistance (earth and sand abrasion resistance).

Referring to FIG. 3, a tooth 20 includes a core 30 and a body 25 disposed to enclose the core 30. The body 25 is made of a first metal. The core 30 extends inside the tooth 20 toward the tip end 21. The core 30 extends along the grain flow 25F in the body 25. The core 30 reaches the tip end 21. As the first metal forming the body 25, steel, for example, can be adopted. More specifically, for the first metal, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon), for example, can be adopted. The core 30 is higher in wear resistance than the body 25.

Figure 4:
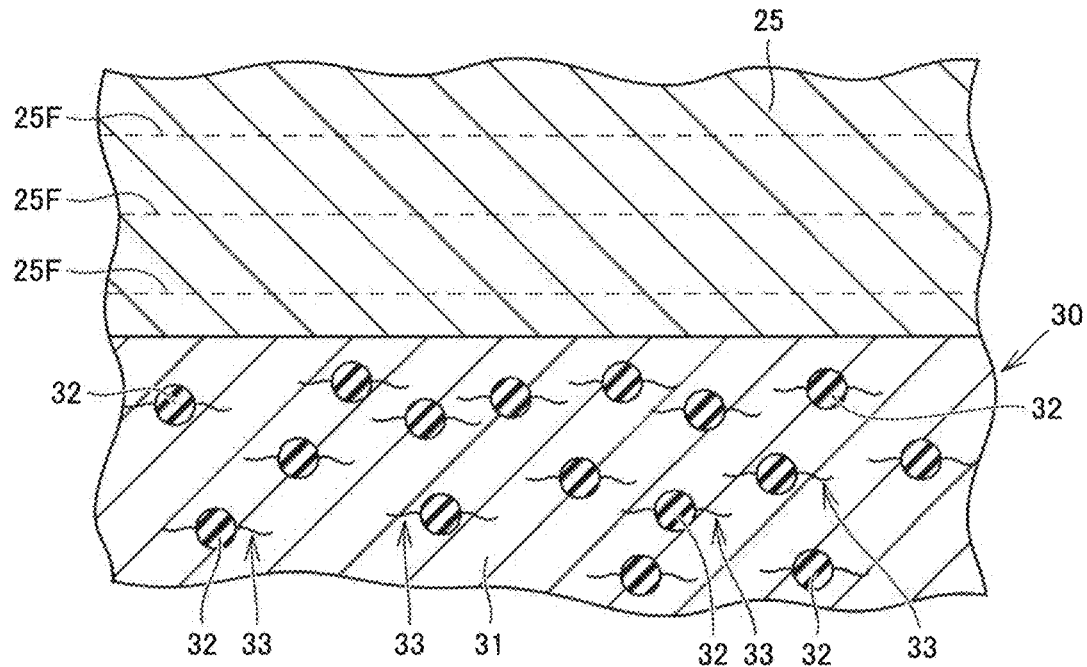
FIG. 4 is a schematic cross-sectional view showing the structure at and around an interface between a body and a core.

FIG. 4 shows, in an enlarged view, an interface and its vicinity between the body 25 and the core 30 in FIG. 3. Referring to FIG. 4, the core 30 includes a matrix 31 made of a second metal, first hard particles 32 dispersed in the matrix 31, and a hard structure 33 which is higher in hardness than the matrix 31 and extends from the corresponding first hard particle 32 in a direction along the grain flow 25F in the body 25.

For the second metal constituting the matrix 31, steel, for example, can be adopted. More specifically, for the second metal, carbon steel for machine structural use or alloy steel for machine structural use specified in JIS standard (for example, S45C or SCM435, as well as SMn, SCr, or SCM containing an equivalent amount of carbon), for example, can be adopted. The matrix 31 is, for example, a sintered body obtained as the powder of the above steel is sintered.

The first hard particles 32 are preferably higher in hardness than the body 25. The first hard particles 32 are preferably higher in hardness than the matrix 31. Examples of materials that can be adopted as the material forming the first hard particles 32 include: cemented carbides such as molybdenum carbide, molybdenum carbonitride, tantalum carbide, tantalum carbonitride, tungsten carbide, tungsten carbonitride, etc., and cermets such as titanium carbide, titanium carbonitride, vanadium carbide, vanadium carbonitride, zirconium carbide, zirconium carbonitride, chromium carbide, chromium carbonitride, etc. The first hard particles 32 may have a particle diameter of not less than 0.02 mm and not more than 15 mm, for example.

The hard structure 33 may include an element constituting the first hard particle 32. The hard structure 33 is made, for example, of a material having tungsten or other element constituting the first hard particle 32 added to the second metal constituting the matrix 31. The hard structure 33 is formed, for example, as the elements eluted from the first hard particle 32 are elongated, by forging, in a direction along the grain flow 25F in the body 25.

In the tooth 20 of the present embodiment, high wear resistance is implemented by the presence of the core 30 including the first hard particles 32. The core 30 is not made of a single material, but includes the matrix 31 and the first hard particles 32. When the matrix 31 is made of a material that is expected to offer good adhesion with the body 25, for example a material having a linear expansion coefficient close to that of the material forming the body 25, then the resultant core 30 can improve adhesion between the core 30 and the body 25, while ensuring high wear resistance by the first hard particles 32. The first metal forming the body 25 and the second metal forming the matrix 31 of the core 30 may be a same metal (steel). The presence of the hard structures 33 in the core 30 extending along the grain flow 25F in the body 25 further improves the wear resistance of the core 30, without impairing the adhesion between the core 30 and the body 25.

As explained above, the tooth 20 according to the present embodiment is a wear-resistant component that offers considerably improved wear resistance while ensuring good adhesion between the core 30 and the body 25.

Figure 5:
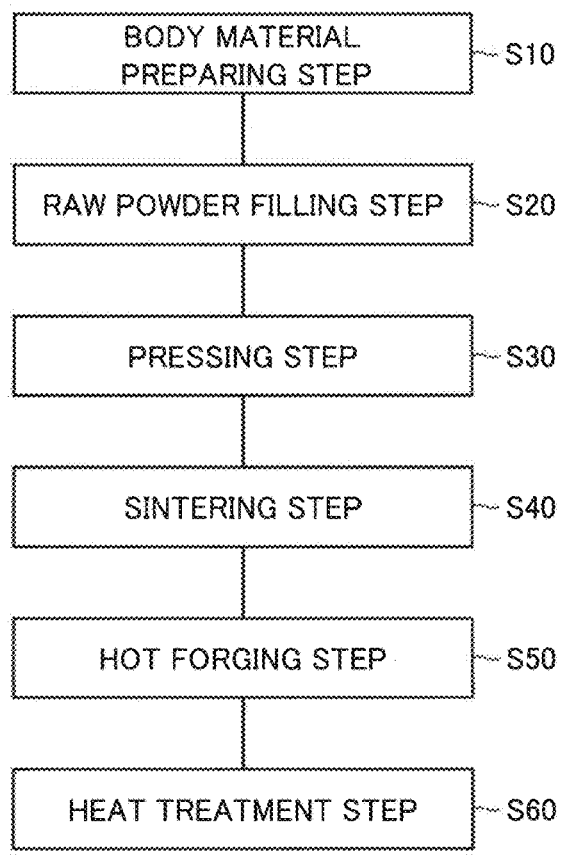
FIG. 5 is a flowchart schematically illustrating a method for producing a tooth according to a first embodiment.
Figure 6:
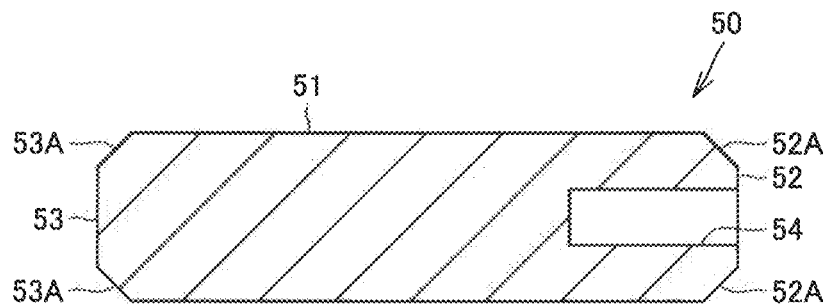
FIG. 6 is a schematic cross-sectional view illustrating the tooth producing method.
Figure 7:
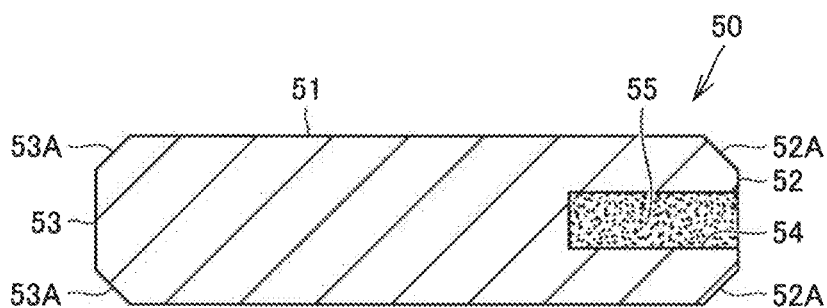
FIG. 7 is a schematic cross-sectional view illustrating the tooth producing method.

A method for producing a tooth 20, which is the wear-resistant component in the present embodiment, will now be described with reference to FIGS. 5 to 7. FIG. 5 is a flowchart schematically illustrating a method for producing a tooth. FIGS. 6 and 7 are schematic cross-sectional views illustrating the tooth producing method.

Referring to FIG. 5, in the method for producing a tooth 20 in the present embodiment, firstly, a body material preparing step is carried out as a step S10. In this step S10, referring to FIG. 6, a base member 50, which is a body material to be a body 25 of the tooth 20, is prepared. The base member 50 is made of a first metal. The base member 50 is of a cylindrical shape. The base member 50 has a cylindrical shape including one end face 52, another end face 53, and a side face 51 connecting the one end face 52 and the other end face 53. A first chamfered portion 52A is formed in a region where the one end face 52 and the side face 51 are connected. A second chamfered portion 53A is formed in a region where the other end face 53 and the side face 51 are connected.

The base member 50 has a recess 54 formed therein, which is a hollow cavity that opens at the one end face 52 and extends in an axial direction (from the one end face 52 toward the other end face 52). The recess 54 has a cylindrical shape, for example. Referring to FIGS. 6 and 3, the one end face 52 side of the base member 50 corresponds to the tip end 21 side of the tooth 20, and the other end face 53 side of the base member 50 corresponds to the proximal end 22 side of the tooth 20.

Next, referring to FIG. 5, a raw powder filling step is carried out as a step S20. In this step S20, referring to FIG.

7, the recess 54 of the base member 50 prepared in the step S10 is filled with raw powders 55 to be the core 30. The raw powders 55, as a mixture of the powder of the second metal and the first hard particles, are filled in the recess 54. For the first hard particles, powder of cemented carbide, for example, can be adopted.

For the powder of the second metal, low-alloy steel powder, high-speed steel powder, tool steel powder, stainless steel powder, superalloy powder, or bearing steel powder can be adopted. The low-alloy steel powder may be alloy steel powder (or iron-base alloy powder) that contains, for example, not less than 0.1 mass % and not more than 0.3 mass % manganese, not less than 1.7 mass % and not more than 2.2 mass % nickel, not less than 0.4 mass % and not more than 0.8 mass % molybdenum, and the remainder made up of iron and unavoidable impurities, or it may be powder of alloy steel for machine structural use such as JIS SCM435. The powder of the second metal may be one of the above types of powder, or may be a mixture of two or more types of powder selected from the group of the above types of powder.

The powder of the second metal may have graphite powder added therein. In the case where the above-described alloy steel powder (or iron-base alloy powder) is adopted as the powder of the second metal, graphite powder may be added thereto in the proportion of about 0.45 mass %, for example, from the standpoint of imparting sufficient hardness to the matrix 31. To the powder of the second metal, a lubricant may also be added in the proportion of about 1.05 mass %, for example. For the lubricant, wax or spindle oil, for example, may be adopted. The powder of the second metal and the first hard particles may be mixed in a ratio by mass of 70:30, for example.

Next, referring to FIG. 5, a pressing step is carried out as a step S30. In this step S30, referring to FIG. 7, the raw powders 55, filled in the recess 54 in the step S20, are compressed by pressing. Although this step S30 is not an indispensable step, when performed, it can reduce voids within the raw powders 55. In the step S30, the raw powders 55 can be compressed under the conditions of not less than 400 kg/cm$^2$ and not more than 6000 kg/cm$^2$ (at 5000 kg/cm$^2$, for example).

Next, referring to FIG. 5, a sintering step is carried out as a step S40. In this step S40, referring to FIG. 7, the raw powders 55 in the recess 54, which have been pressed in the step S30, are sintered. Specifically, for example, the raw powders 55 filled in the recess 54 of the base member 50 are heated to a temperature of not lower than 1100° C. and not higher than 1300° C. (to 1200° C., for example) in an atmosphere of AX gas (ammonia cracking gas) or in a vacuum, for sintering. Although this step S40 is not an indispensable step, when performed, the raw powders 55 can be reliably sintered.

Next, a hot forging step is carried out as a step S50. In this step S50, the base member 50 with the raw powders 55 in the recess 54 sintered in the step S40 is hot forged. Referring to FIGS. 7 and 3, the base member 50 with the raw powders 55 in the recess 54 sintered is heated to a temperature enabling hot forging, placed in a die having a cavity corresponding to a desired shape of the tooth 20, and then forged. As a result of hot forging, the raw powders 55 become a core 30. As a result of hot forging, the base member 50 becomes a body 25. Even when the above step S40 is omitted, the step S50 may be carried out under the conditions allowing sintering of the raw powders 55, so that the raw powders 55 are sintered to become the core 30. In the above-described manner, the tooth 20 having the structure shown in FIG. 3 is obtained.

Next, referring to FIG. 5, a heat treatment step is carried out as a step S60. In this step S60, the base member 50 hot forged in the step S50 is subjected to heat treatment. The heat treatment carried out in the step S60 is, for example, quenching and tempering. This imparts desired hardness and toughness to the body 25 of the tooth 20. Through the above procedure, the tooth 20 in the present embodiment is completed.

Second Embodiment

Figure 8:
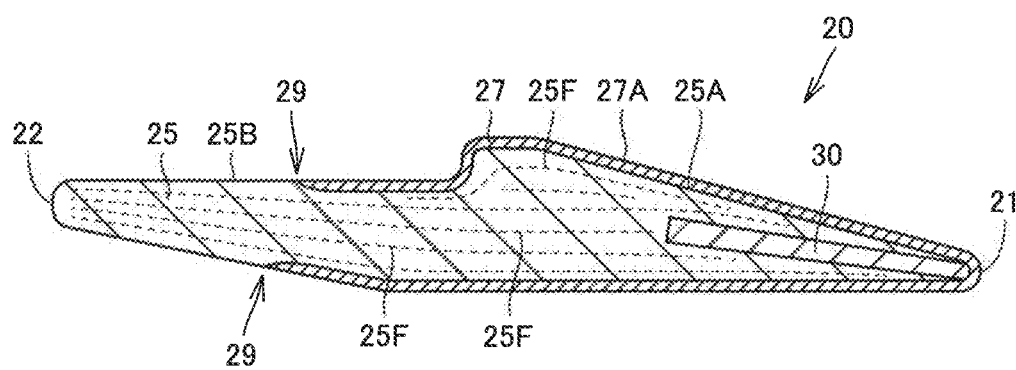
FIG. 8 is a schematic cross-sectional view showing the structure of a tooth according to a second embodiment.

A tooth as a wear-resistant component in a second embodiment of the present invention will now be described. FIG. 8 is a schematic cross-sectional view showing the structure of a tooth in the second embodiment. FIG. 8 is a cross-sectional view corresponding to FIG. 3 which shows the structure of the tooth in the first embodiment.

Referring to FIGS. 8 and 3, the tooth 20 in the second embodiment basically has a similar structure as that in the first embodiment and provides similar effects as those in the first embodiment. The tooth 20 in the second embodiment differs from that in the first embodiment in that it has an overlay formed on the surface.

Referring to FIG. 8, the tooth 20 in the second embodiment includes a core 30, a body 25 made of a first metal and disposed to enclose the core 30, and an overlay 27 disposed in contact with the body 25 to cover a covered region 25A that is a part of a surface of the body 25. In an overlay edge portion 29 corresponding to a boundary between the covered region 25A and an exposed region 25B that is a region other than the covered region 25A on the surface of the body 25, the exposed region 25B and a surface 27A of the overlay 27 are flush with each other to form a forged surface. The surface 27A of the overlay 27 is entirely the forged surface. The overlay 27 has higher wear resistance (earth and sand abrasion resistance) than the body 25.

Referring to FIG. 8, the tooth 20 according to the present embodiment has, not only the core 30 which offers high wear resistance as in the first embodiment, but also the overlay 27 which also offers high wear resistance. As a result, the tooth 20 in the second embodiment offers still higher wear resistance. Further, the exposed region 25B and the surface 27A of the overlay 27 are flush with each other in the overlay edge portion 29. This can prevent an increase in penetration resistance (resistance when the tooth 20 penetrates the earth and sand or the like) otherwise caused by a step in the overlay edge portion 29. With the overlay edge portion 29 included in the forged surface, the working step such as cutting for making the exposed region 25B and the surface 27A of the overlay 27 flush with each other can be omitted. Consequently, the working on the overlay edge portion 29 where the difference in hardness is great and the working on the overlay 27 which is high in hardness can be avoided.

As explained above, according to the tooth 20 in the present embodiment, it is possible to achieve excellent wear resistance, while preventing an increase in penetration resistance attributable to formation of the overlay 27. Further, an overlay may be formed on a base member and then forging may be performed to shape a region including the tip end 21. By doing so, the region including the tip end 21 can readily be covered with the overlay 27, as shown in FIG. 8, and a tooth 20 having high wear resistance can be obtained. The core 30 extends along the grain flow 25F in the body 25 toward the tip end 21. The core 30 reaches the tip end 21 (or the overlay 27 covering the tip end 21).

Figure 9:
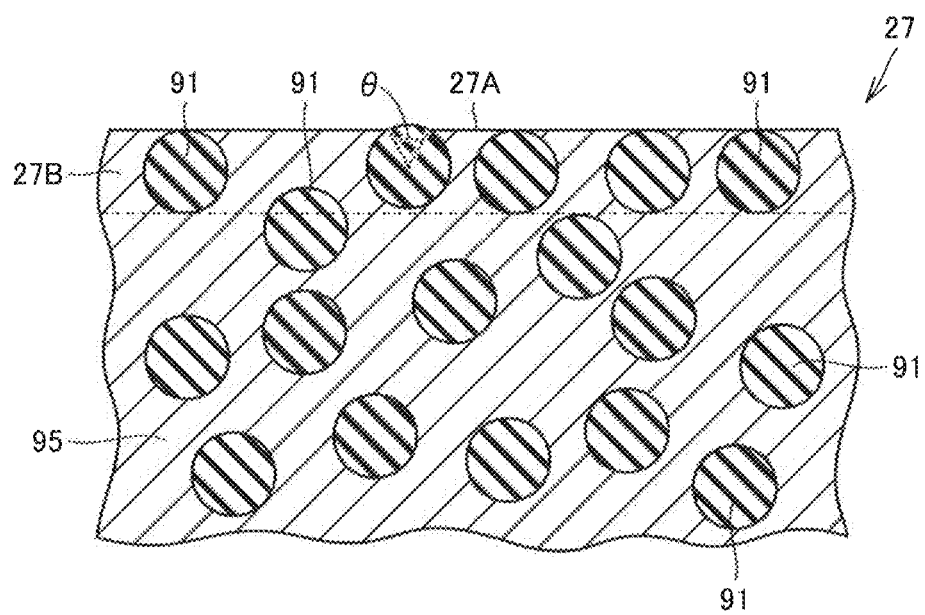
FIG. 9 is a schematic cross-sectional view showing the structure of an overlay in the vicinity of its surface.
Figure 10:
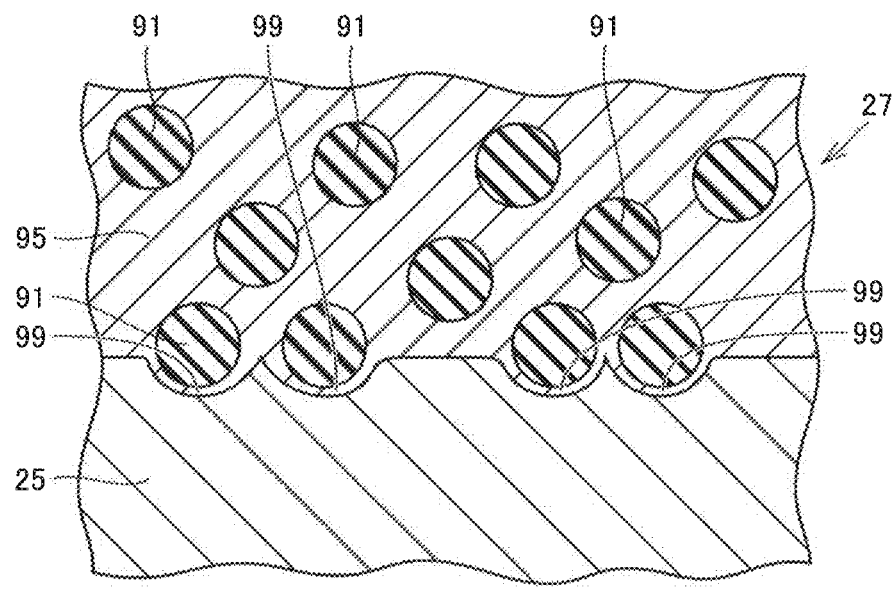
FIG. 10 is a schematic cross-sectional view showing the structure at and around an interface between the overlay and the body.

The structure of the overlay 27 will now be described. FIG. 9 is a schematic cross-sectional view showing the structure of an overlay in the vicinity of its surface. FIG. 10 is a schematic cross-sectional view showing the structure at and around an interface between the overlay and a body. Referring to FIGS. 9 and 10, the overlay 27 includes a base matrix 95 made of a third metal, and second hard particles 91 dispersed in the base matrix 95. The third metal forming the base matrix 95 may be, for example, a mixture of a metal derived from a welding wire and the first metal forming the body 25. As the second hard particles 91, particles having higher hardness than the base matrix 95 may be adopted. Examples of such particles include: cemented carbides such as molybdenum carbide, molybdenum carbonitride, tantalum carbide, tantalum carbonitride, tungsten carbide, tungsten carbonitride, etc., as well as cermets such as titanium carbide, titanium carbonitride, vanadium carbide, vanadium carbonitride, zirconium carbide, zirconium carbonitride, chromium carbide, chromium carbonitride, etc. The second hard particles 91 preferably have higher hardness than the body 25. The second hard particles 91 may have a particle diameter of, for example, not less than 0.02 mm and not more than 9 mm, and preferably not less than 0.2 mm and not more than 9 mm.

Referring to FIG. 9, the surface 27A of the overlay 27 is a forged surface. The second hard particles 91 located in an overlay surface region 27B, which is a region within an average particle diameter of the second hard particles 91 from the surface 27A of the overlay 27, are arranged side by side while being embedded in the overlay 27. This prevents the second hard particles 91 from being arranged protruding noticeably from the surface 27A of the overlay 27. This consequently prevents the second hard particles 91 from falling off during the use of the tooth 20, thereby implementing improved wear resistance of the tooth 20.

The second hard particles 91 located in the overlay surface region 27B may be arranged in contact with the surface 27A of the overlay 27, as shown in FIG. 9. With this, the region of a second hard particle 91 exposed from the surface 27A of the overlay 27 becomes small, which prevents the second hard particle 91 from falling off.

A second hard particle 91 having a region exposed from the surface 27A of the overlay 27 preferably has an acute central angle θ (of less than 90°) corresponding to that exposed region. With this, the region of the second hard particle 91 exposed from the surface 27A of the overlay 27 becomes small, which prevents the second hard particle 91 from falling off.

Referring to FIG. 10, in a region including an interface between the overlay 27 and the body 25, the overlay 27 includes protrusions 99 that protrude toward the body 25. The protrusions 99 provide an anchor effect to prevent the overlay 27 from coming off the body 25. A protrusion 99 receives at least a part of a second hard particle 91. This more reliably prevents the overlay 27 from coming off the body 25. There exists the base matrix 95 of the overlay 27 between the body 25 and the second hard particle 91 received in the protrusion 99. The second hard particle 91 received in the protrusion 99 is not in contact with the body 25. The second hard particle 91 has its center located outside the protrusion 99 (i.e., a part of the second hard particle 91 having a volume less than a half thereof is received in the protrusion 99). One second hard particle 91 is received in one protrusion 99. Each protrusion 99 has a depth that is smaller than the radius of the second hard particle 91 received in the protrusion 99.

Figure 11:
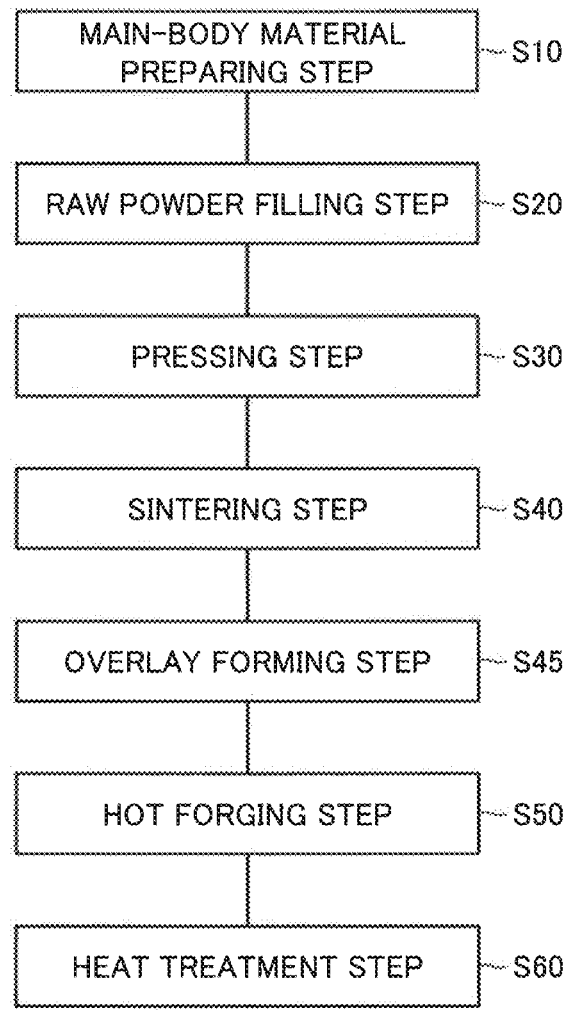
FIG. 11 is a flowchart schematically illustrating a method for producing a tooth according to the second embodiment.
Figure 12:
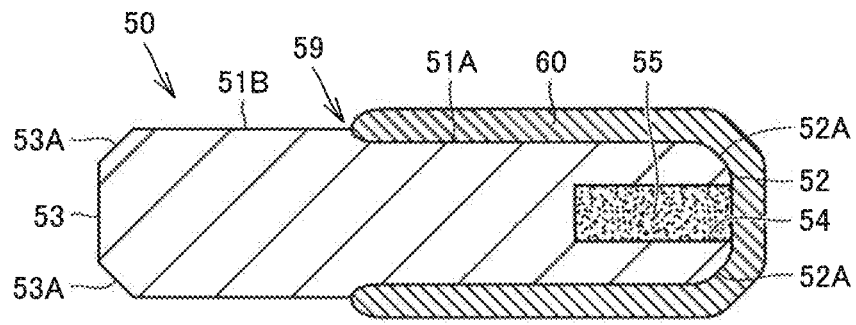
FIG. 12 is a schematic cross-sectional view illustrating the tooth producing method according to the second embodiment.
Figure 13:
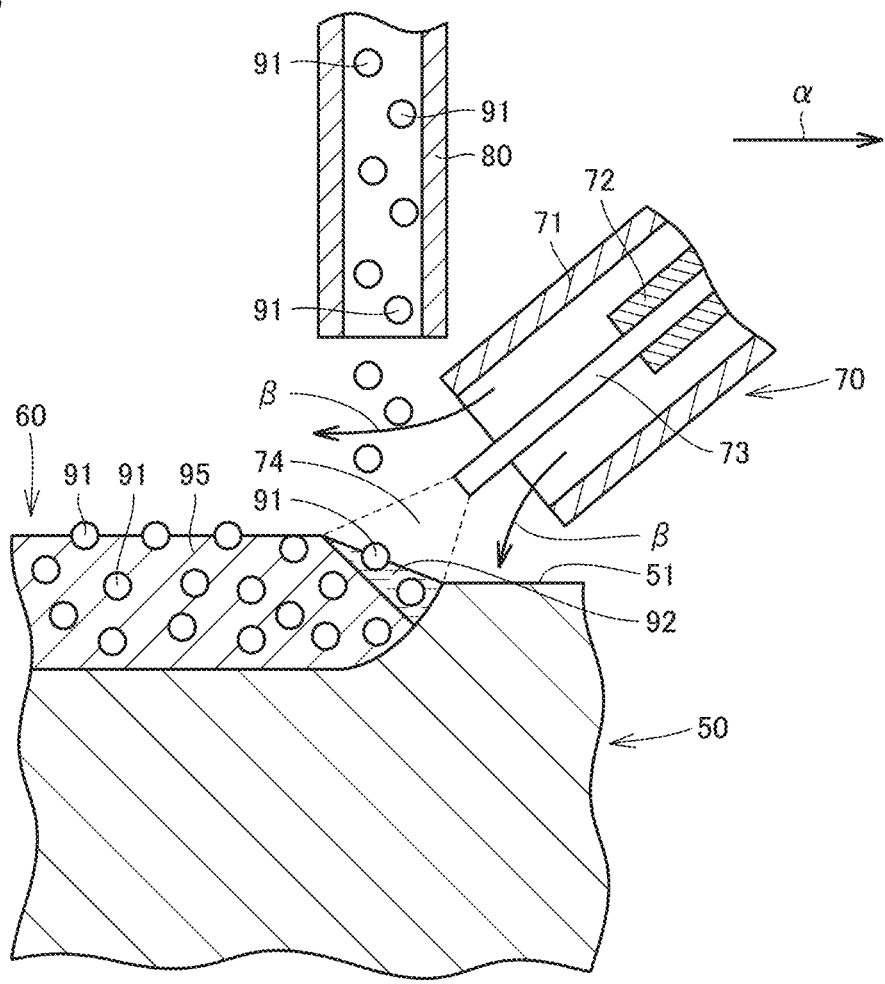
FIG. 13 is a schematic cross-sectional view illustrating a method for forming an overlay.

A method for producing a tooth 20, which is the wear-resistant component in the present embodiment, will now be described with reference to FIGS. 11 to 13. FIG. 11 is a flowchart schematically illustrating a method for producing a tooth. FIG. 12 is a schematic cross-sectional view illustrating the tooth producing method. FIG. 13 is a schematic cross-sectional view illustrating a method for forming an overlay.

The method for producing a tooth 20 in the second embodiment is carried out basically in a procedure similar to that of the method for producing a tooth 20 in the first embodiment. Referring to FIG. 11, in the method for producing a tooth 20 in the second embodiment, firstly, the steps S10 to S40 are carried out in a similar manner as in the first embodiment. As a result, as in the first embodiment, the base member 50 with the raw powders 55 in the recess 54 sintered, is obtained (see FIG. 7).

Next, an overlay forming step is carried out as a step S45. In this step S45, referring to FIGS. 7 and 12, an overlay 60 is formed in contact with a covered region 51A that is a part of a surface of the base member 50 with the raw powders 55 in the recess 54 sintered in the step S40, to cover the covered region 51A. The overlay 60 is formed such that it will cover a desired region of the body 25 when hot forging is carried out afterwards. The covered region 51A can be determined in advance through a simulation of hot forging using a finite element method, for example. In the present embodiment, referring to FIG. 12, the overlay 60 is formed to cover the one end face 52 side of the side face 51, the first chamfered portion 52A, and the one end face 52.

The overlay 60 may be formed by, for example, overlaying welding using $CO_2$ arc welding as described below. First, an overlay forming device will be described. Referring to FIG. 13, the overlay forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the tip end side of the welding nozzle 71. For the welding wire 73, JIS YGW12, for example, may be adopted. A gap between the welding nozzle 71 and the contact tip 72 is a flow path of shielding gas. The shielding gas flowing through the flow path is discharged from the tip end of the welding nozzle 71. The hard particles supplying nozzle 80 has a hollow cylindrical shape. Inside the hard particles supplying nozzle 80, second hard particles 91 are supplied, which are discharged from the tip end of the hard particles supplying nozzle 80.

This overlay forming device can be used to form an overlay 60 in the following procedure. With a base member 50 as one electrode and the welding wire 73 as another electrode, voltage is applied across the base member 50 and the welding wire 73. This generates an arc 74 between the welding wire 73 and the base member 50. The arc 74 is shielded from the ambient air by the shielding gas discharged from the tip end of the welding nozzle 71 along the arrows β. For the shielding gas, carbon dioxide, for example, may be adopted. The heat in the arc 74 melts a part of the base member 50 and also melts the tip end of the welding wire 73. The tip end of the welding wire 73 thus molten forms droplets, which transfer to the molten region of the base member 50. This forms a molten pool 92 which is a liquid region where the molten base member 50 and the molten welding wire 73 are mixed together. The second hard particles 91 discharged from the hard particles supplying nozzle 80 are supplied to this molten pool 92.

As the welding torch 70 and the hard particles supplying nozzle 80 constituting the overlaying welding device move relatively in the direction shown by the arrow a with respect to the base member 50, the position where the molten pool 92 is formed moves accordingly. The molten pool 92 previously formed solidifies, resulting in an overlay 60. The overlay 60 includes a base matrix 95 formed by solidification of the molten pool 92, and second hard particles 91 dispersed in the base matrix 95. Through the above procedure, the overlay 60 is formed to cover the covered region 51A on the surface of the base member 50. The surface of the base member 50 on which no overlay 60 has been formed is the exposed region 51B. Referring to FIG. 12, a boundary between the covered region 51A and the exposed region 51B is an overlay edge portion 59. It should be noted that overlaying welding may be carried out, for example, under the following conditions: welding current of 230 A, welding voltage of 17 V, hard particles feed rate of 110 g/min, and excess bead height of 4 mm. For the welding wire, JIS YGW11 may be adopted. For the second hard particles, tungsten carbide (for example, WC- or $W_2C$-based) particles may be adopted.

The description has been made above about the case where the overlay 60 is formed by $CO_2$ arc welding, during which the welding wire including the material constituting the third metal is supplied. Alternatively, the overlay 60 may be formed by plasma transferred arc (PTA) welding or laser welding, which are overlay welding methods during which powders including the material constituting the third metal are supplied instead of the welding wire.

Next, a hot forging step is carried out as a step S50. In the step S50 in the present embodiment, the base member 50 with the overlay 60 formed in the step S45 is hot forged. Referring to FIGS. 12 and 8, the base member 50 with the overlay 60 formed is hot forged similarly as in the first embodiment. With this hot forging, a region of the base member 50 including the overlay edge portion 59 is worked. As a result of hot forging, the overlay edge portion 59 becomes an overlay edge portion 29. With the overlay edge portion 59 worked in hot forging, a tooth 20 is obtained which has the exposed region 25B and the surface 27A of the overlay 27 flush with each other in the overlay edge portion 29. In the overlay edge portion 29, the exposed region 25B and the surface 27A of the overlay 27 form a flush, forged surface corresponding to the region of the surface of the die used in the hot forging where the overlay edge portion 59 is worked. In the overlay edge portion 29, the exposed region 25B and the surface 27A of the overlay 27 form a flush surface corresponding to the shape of the die for forging. The overlay edge portion 29 is included in the forged surface.

Referring to FIGS. 13 and 9, as the base member 50 having the overlay 60 formed is hot forged, the second hard particles 91 that were protruding from a surface of the overlay 60 at the time of formation of the overlay 60 are pressed into the overlay 60. As a result, in the tooth 20, the second hard particles 91 located in the overlay surface region 27B are arranged to contact the surface 27A of the overlay 27 (see FIG. 9). Among the second hard particles 91 located in the overlay surface region 27B, any second hard particle 91 having a region exposed from the surface 27A of the overlay 27 has an acute central angle θ (of less than 90°) corresponding to the exposed region. This prevents the second hard particle 91 from falling off during the use of the tooth 20, thereby implementing improved wear resistance of the tooth 20.

Referring to FIGS. 13 and 10, as the base member 50 having the overlay 60 formed is hot forged, in the tooth 20, protrusions 99 are formed in the overlay 27 in consequence of the second hard particles 91 that were located in the vicinity of the interface between the overlay 60 and the base member 50 at the time of formation of the overlay 60. In a protrusion 99, at least a part of a corresponding second hard particle 91 is received. The above process simultaneously forms the surface region of the overlay 27 which is excellent in wear resistance with the second hard particles 91 arranged in contact with the surface 27A, and the protrusions 99 which prevent the overlay 27 from coming off the body 25. Thereafter, a heat treatment step is carried out as a step S60 as in the first embodiment. Through the above procedure, the tooth 20 in the present embodiment is completed.

In the wear-resistant component producing method in the above embodiment, when forming the overlay on the base member, a surface portion of the base member corresponding to the region of the base member where the overlay is to be formed may be removed in advance, or, an undercut portion may be formed in the base member, before formation of the overlay. This reduces the deformation amount of the overlay at the time of forging, thereby preventing, for example, wrinkling of the forged overlay.

EXAMPLES

A tooth 20 was produced in a similar procedure as the producing method described in the second embodiment, and a test was conducted to examine the structures of the core 30 and the overlay 27.

Figure 14:
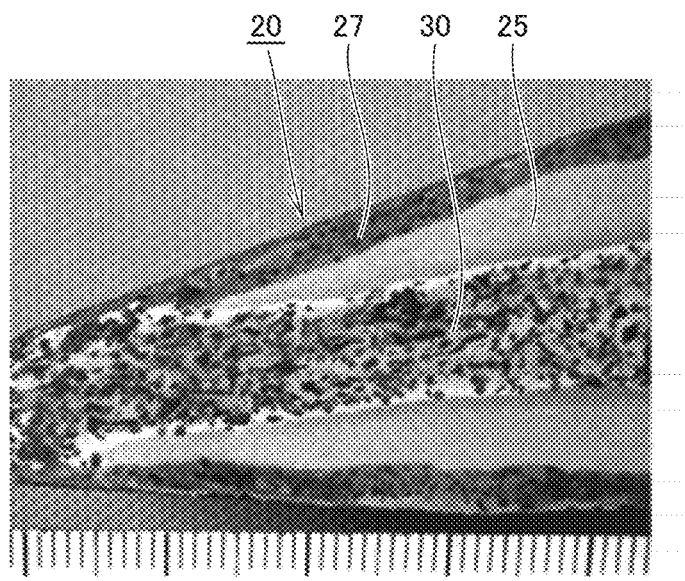
FIG. 14 is a photograph showing a cross section of a tooth.

FIG. 14 is a photograph showing a cross section of the tooth 20 in the vicinity of its tip end 21. Referring to FIG. 14, the tooth 20 obtained includes the core 30 having the first hard particles dispersed in the matrix, the body 25 enclosing the core 30, and the overlay 27 having the second hard particles dispersed in the base matrix and covering the covered region of the body 25. It is thus confirmed that the tooth 20 in the second embodiment can be produced by the producing method in the second embodiment. No obvious defect such as cracking is observed between the core 30 and the body 25 and between the overlay 27 and the body 25.

Figure 15:
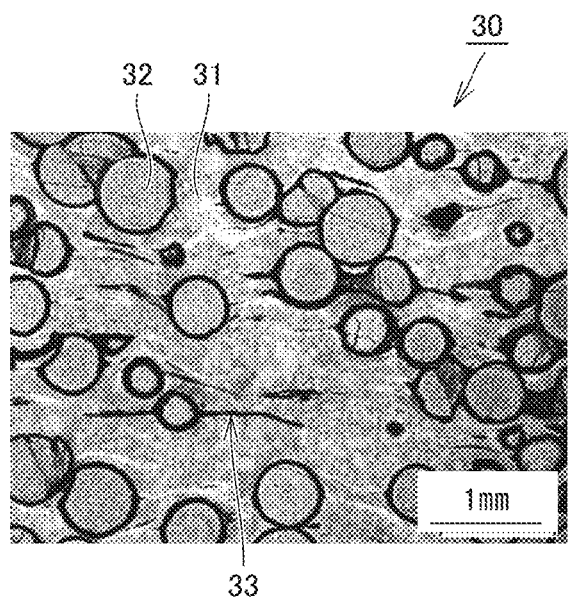
FIG. 15 is an optical micrograph showing a cross section of the core.

FIG. 15 is an optical micrograph obtained by zooming in on the core 30 of the tooth 20. Prior to observation and imaging, the core 30 was etched using an etchant. Referring to FIG. 15, it is confirmed that the core 30 includes the matrix 31, the first hard particles 32 dispersed in the matrix 31, and the hard structures 33 extending from the first hard particles 32. The hard structures 33 extend along the grain flow in the body.

Figure 16:
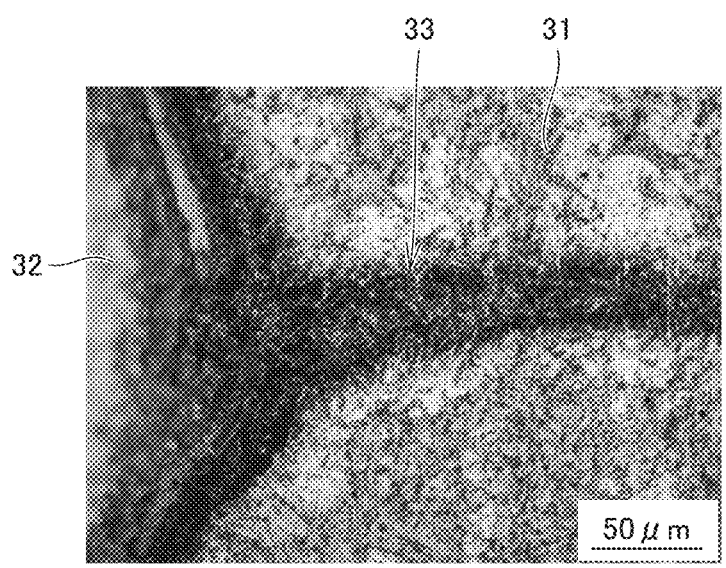
FIG. 16 is an optical micrograph showing, in an enlarged view, vicinity of an interface between a first hard particle and the matrix.

FIG. 16 is an optical micrograph obtained by further zooming in on an interface and its vicinity between a first hard particle 32 and the matrix 31. Referring to FIG. 16, it is confirmed that the hard structure 33 is not a hollow space, but the structure deeply etched as compared to the adjacent structure (or, the structure susceptible to etching as compared to the neighboring structure).

Figure 17:
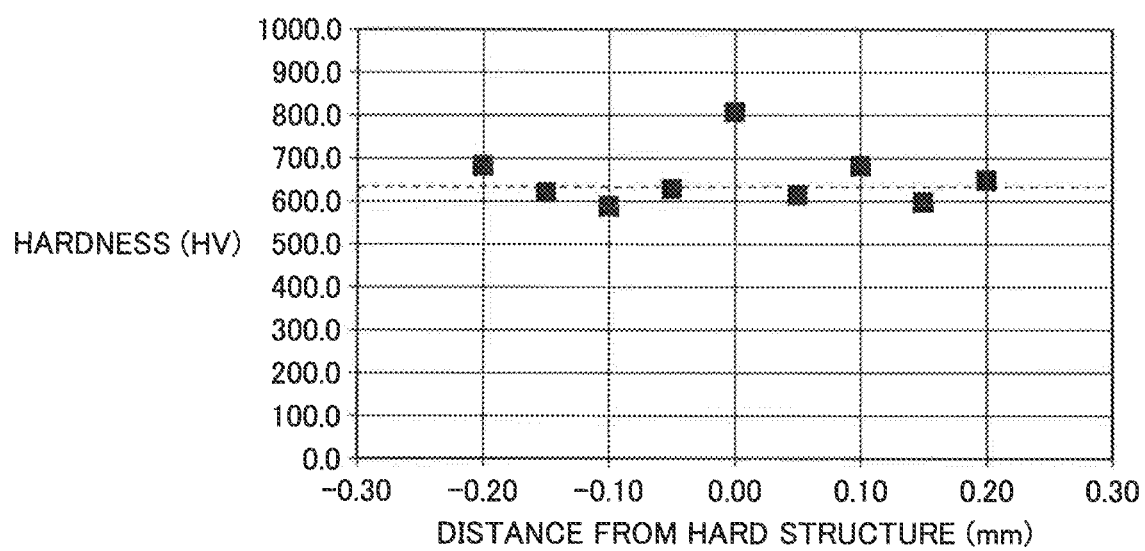
FIG. 17 illustrates hardness distribution at and around a hard structure.

For evaluation of hardness of the hard structure 33, distribution of hardness in a direction perpendicular to the direction of extension of the hard structure 33 was measured. For measurement of the hardness, a micro Vickers hardness tester was used. FIG. 17 shows hardness measurement results. In FIG. 17, the horizontal axis represents distance from a hard structure 33. In FIG. 17, the vertical axis represents hardness (Vickers hardness). The data point at the center on the horizontal axis, with the distance from the hard structure 33 being zero, corresponds to the hardness of the hard structure 33. The remaining data points correspond to the hardness of the matrix 31.

Referring to FIG. 17, while the matrix 31 has an average hardness of 632.7 HV (see the broken line in FIG. 17), the hard structure 33 has a hardness exceeding 800 HV. It is thus confirmed that the hard structure 33 is a structure which is higher in hardness than the matrix 31.

Figure 18:
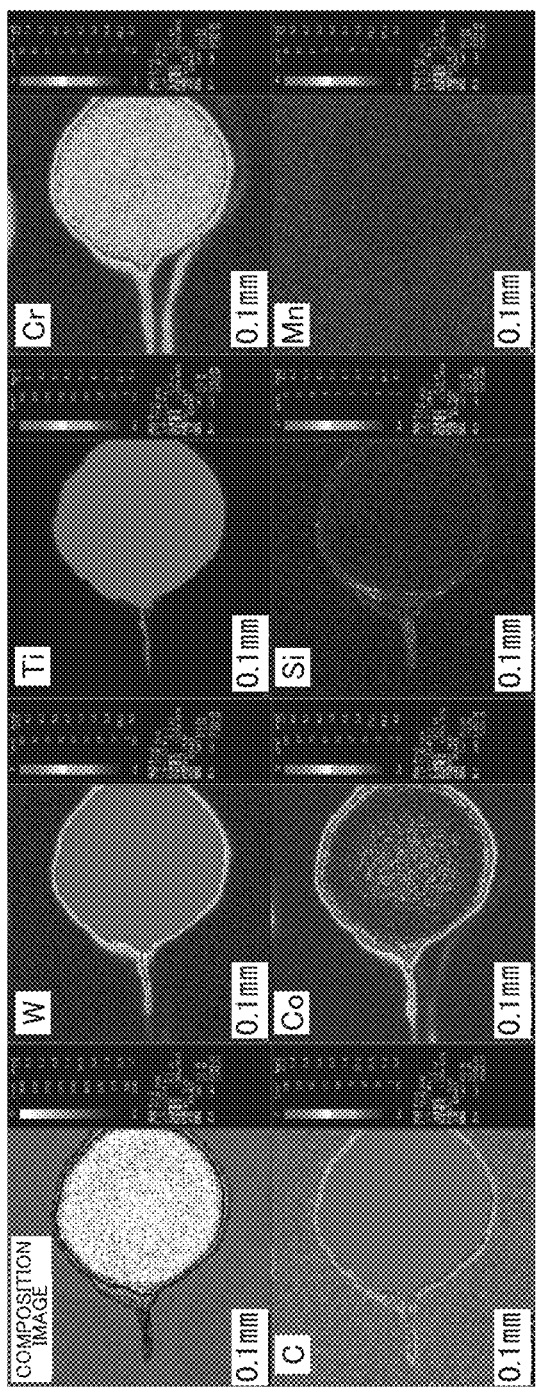
FIG. 18 shows EPMA results indicating the distribution states of elements in the vicinity of a first hard particle.

For examination of the component composition of the hard structure 33, a first hard particle 32 and its surroundings including the hard structure 33 was subjected to electron probe micro analysis (EPMA). FIG. 18 shows the EPMA results, indicating the states of distribution of elements in and around the first hard particle. The name of the element at the upper left of each image in FIG. 18 indicates the element that was to be sensed in the image.

Referring to FIG. 18, in the hard structure 33, tungsten (W), carbon (C), cobalt (Co), titanium (Ti), and chromium (Cr) are sensed strongly. These elements are all included in the material (cemented carbide) constituting the first hard particle 32. It is thus considered that the hard structure 33 has been formed with the elements constituting the first hard particle 32 eluted into the matrix 31.

Figure 19:
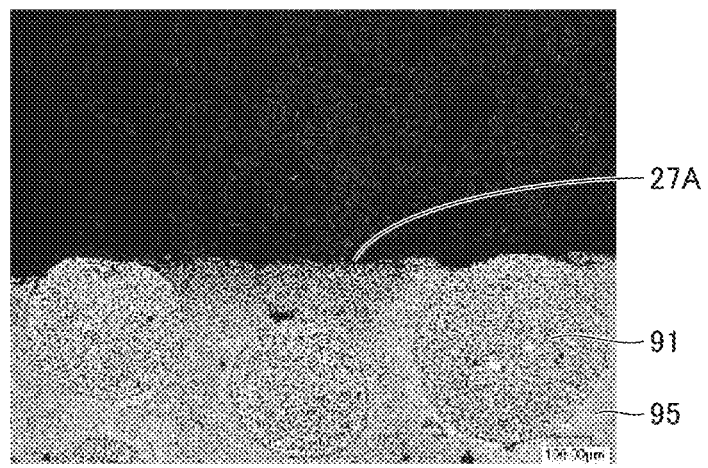
FIG. 19 is an optical micrograph of an overlay in the vicinity of its surface.

FIG. 19 is an optical micrograph of a surface and its vicinity of the overlay 27. Referring to FIG. 19, in the overlay 27 which has been formed and then worked by forging, the second hard particles 91 located in the surface region are arranged side by side in the state being embedded in the overlay (base matrix 95). The second hard particles 91 are aligned in contact with the surface 27A of the overlay 27. Of the second hard particle 91 having a region exposed from the surface 27A of the overlay 27, the central angle θ corresponding to the exposed region is an acute angle (of less than 90°). This is presumably because, during the process in which the overlay 27 is worked by forging, any second hard particle 91 protruding from the surface 27A of the overlay 27 is pressed into the base matrix 95 having relatively low hardness.

Figure 20:
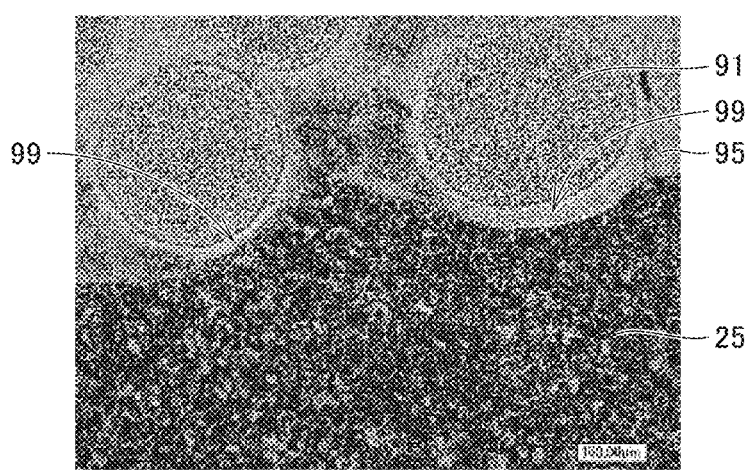
FIG. 20 is an optical micrograph of an interface between the overlay and the body and its vicinity.

FIG. 20 is an optical micrograph of an interface and its vicinity between the overlay 27 and the body 25. Referring to FIG. 20, in the overlay 27 which has been formed and then worked by forging, in the region including the interface between the overlay 27 (base matrix 95) and the body 25, protrusions 99 are formed with the overlay 27 (base matrix 95) protruding toward the body 25. In each protrusion 99, a part of a corresponding second hard particle 91 is received. It is conceivable that the protrusions 99 have been formed while the overlay 27 was worked by forging, in consequence of the second hard particles 91 present in the vicinity of the interface with the base member. A second hard particle 91 that has contributed to the formation of a protrusion 99 has at least a part received in the protrusion 99.

While a bucket tooth for a work machine (hydraulic excavator) has been described as an example of the wear-resistant component of the present invention in the above embodiments and examples, the wear-resistant component according to the present invention is not limited to a bucket tooth. The wear-resistant component according to the present invention is applicable to various components requiring wear resistance, which for example include: a chisel; a bit; a track bushing, sprocket tooth, and shoe lug constituting a tracked undercarriage of a work machine (such as a bulldozer); a bucket, tooth adapter, lip, shroud between teeth, and corner guard of a hydraulic excavator; a cutting edge, end bit, tooth, ripping tip, protector, wear plate, and shank of a ground engaging tool (GET) component; and a chopper of iron ring of a trash compactor. While a solid tooth for a small-sized hydraulic excavator has been described as the bucket tooth in the above embodiment, the wear-resistant component according to the present invention is also applicable to a tooth for a middle- or large-sized hydraulic excavator, which tooth is attached to cover a bucket adapter for use.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The wear-resistant component and its producing method according to the present invention are applicable particularly advantageously to a wear-resistant component requiring improved wear resistance and to its producing method.

DESCRIPTION OF REFERENCE NUMERALS

1: bucket; 10: main body; 12: periphery of opening; 20: tooth; 21: tip end; 22: proximal end; 25: body; 25A: covered region; 25B: exposed region; 25F: grain flow; 27: overlay; 27A: surface; 27B: overlay surface region; 29: overlay edge portion; 30: core; 31: matrix; 32: first hard particle; 33: hard structure; 40: mounting portion; 50: base member; 51: side face; 51A: covered region; 51B: exposed region; 52: end face; 52A: first chamfered portion; 53: end face; 53A: second chamfered portion; 54: recess; 55: raw powder; 59: overlay edge portion; 60: overlay; 70: welding torch; 71: welding nozzle; 72: contact tip; 73: welding wire; 74: arc; 80: hard particles supplying nozzle; 91: second hard particle; 92: molten pool; 95: base matrix; and 99: protrusion.

The invention claimed is:

1. A wear-resistant component comprising:
a body made of a first metal; and
a core enclosed by the body, the core extending in a direction along a grain flow in the body, the core including:
   a matrix made of a second metal that is a sintered body,
   a plurality of first hard particles dispersed in the matrix, and
   a hard structure extending from a corresponding first hard particle of the plurality of first hard particles in the direction along the grain flow in the body, the hard structure having a greater hardness than a hardness of the matrix, the hard structure including an element constituting the first hard particle of the plurality of first hard particles.

2. The wear-resistant component according to claim 1, wherein the first metal is steel.

3. The wear-resistant component according to claim 1, wherein the second metal is steel.

4. The wear-resistant component according to claim 1, further comprising an overlay in contact with the body and covering a covered region, the covered region being a part of a surface of the body,
wherein, in an overlay edge portion corresponding to a boundary between the covered region and an exposed region other than the covered region on the surface of the body, the exposed region and a surface of the overlay are flush with each other and form a forged surface.

5. The wear-resistant component according to claim 4, wherein the overlay includes:
a base matrix made of a third metal, and
a plurality of second hard particles dispersed in the base matrix.

6. The wear-resistant component according to claim 5, wherein the plurality of second hard particles are disposed in an overlay surface region and are embedded in the overlay side by side, the overlay surface region being a region within an average particle diameter of the plurality of second hard particles from the surface of the overlay.

7. The wear-resistant component according to claim 6, wherein the plurality of second hard particles located in the overlay surface region are in contact with the surface of the overlay.

8. The wear-resistant component according to claim 6, wherein a second hard particle of the plurality of second hard particles has a region exposed from the surface of the overlay has an acute central angle corresponding to the region exposed from the surface of the overlay.

9. The wear-resistant component according to claim 5, wherein in a region including an interface between the overlay and the body, the overlay includes a protrusion that protrudes toward the body.

10. The wear-resistant component according to claim 9, wherein the protrusion includes at least a part of a second hard particle of the plurality of second hard particles.

11. The wear-resistant component according to claim 1, wherein:
the wear-resistant component has a tip end, and
the core extends toward the tip end.

12. A method of producing the wear-resistant component of claim 1, the method comprising:
preparing the body material made of the first metal and having a recess;
filling the recess with raw powders including powder of the second metal and the plurality of first hard particles; and
forming, by hot forging, the body having the recess filled with the raw powders so as to form the core.

* * * * *